United States Patent [19]

Bagnoli et al.

[11] Patent Number: 5,214,776
[45] Date of Patent: May 25, 1993

[54] MULTIPROCESSOR SYSTEM HAVING GLOBAL DATA REPLICATION

[75] Inventors: Carlo Bagnoli, Milan; Angelo Casamatta, Cornaredo; Angelo Lazzari, Vigevano, all of Italy

[73] Assignee: Bull HN Information Systems Italia S.p.A., Billerica, Mass.

[21] Appl. No.: 423,820

[22] Filed: Oct. 18, 1989

[30] Foreign Application Priority Data

Nov. 18, 1988 [IT] Italy .................................. 22652 A/88

[51] Int. Cl.⁵ .................... G06F 12/00; G06F 13/00
[52] U.S. Cl. ............................... 395/425; 364/DIG. 1;
364/242.6; 364/243; 364/256.6; 364/256.8;
364/269; 364/944.92; 364/964.27; 364/964.7
[58] Field of Search ... 364/200 MS File, 900 MS File;
395/425

[56] References Cited

U.S. PATENT DOCUMENTS

| | | | |
|---|---|---|---|
| 4,714,995 | 12/1987 | Materna et al. | 364/200 |
| 4,805,106 | 2/1989 | Pfeifer | 364/200 |
| 4,831,512 | 5/1989 | Nakai et al. | 364/200 |
| 4,847,804 | 7/1989 | Schaffer et al. | 364/900 |
| 4,928,224 | 5/1990 | Zulian | 364/200 |
| 4,959,777 | 9/1990 | Holman, Jr. | 364/200 |
| 4,975,870 | 12/1990 | Knicely et al. | 364/900 |
| 5,067,071 | 11/1991 | Schanin et al. | 395/275 |

Primary Examiner—Joseph L. Dixon
Assistant Examiner—Behzad James Peikari
Attorney, Agent, or Firm—J. H. Phillips; J. S. Solakian

[57] ABSTRACT

A multiprocessor system having global data replicated in all local memories, each local memory related to one of the system central processing units (CPUs), where consistency of the global data in each of the local memories is provided by a global write procedure according to which an agent CPUZ, willing to modify a global data in its own local memory, issues a write command on the system bus for performing the write operation in the local memory of another destination CPU of the system and characterizes the write command as a global write, so that all the CPUs connected to the system bus (including CPUZ) detect such command, perform such write operation in their related local memory and provide the destination CPU with a signal indicative of a performed write operation, so that the destination CPU, as "replier", may signal to CPUZ the successful execution of the global write. By this procedure, it is possible to use standard, commercially available system bus and interface circuits which require, for correct execution of the system bus protocol, the activation of both an "agent" or requesting processor and a "replier" or destination processor.

2 Claims, 2 Drawing Sheets

MULTIPROCESSOR SYSTEM HAVING GLOBAL DATA REPLICATION

The present invention relates to a multiprocessor system having global data replication, that is a system where each processor is provided with its own local memory and information used by all processors (global data) is replicated in each of the local memories.

The several processors communicate each with the others through a systems bus. They can also share peripheral units and common memory resources through the system bus.

An architecture of this kind is the subject of the European patent application published with N. 0320607, of the same applicant. To this application reference is made for a detailed explanation of the concept and the advantages provided by global data replication.

This architecture provides remarkable advantages in terms of performance because each processor may have access to global data for read operations without needing access to the system bus.

However, this architecture requires that the global data replicated in each of the several local memories be always consistent with one another.

Every time a global datum is modified or written in a local memory the same datum has to be written in all other local memories.

The already mentioned patent application describes circuits which enable each system processor to perform these global write operations in all the local memories through the system bus.

These circuits, however simple, do not allow for the use of integrated coprocessors, available on the market, for managing the message transfer on the system bus with "handshaking" procedures and for providing all the required functions of arbitration, buffering and control of the exchanged information.

In addition the deadlock problems arise when more entities contend for a common resource needed for completion of some operation by another unit (local busses and system bus). Such problems are solved with "retry" procedures which, in some cases may be directly performed by hardware circuits with negligible time losses; however, in the case of certain operations such as "read-modify-write" operations, solution requires the intervention of software routines and therefore involves significant time losses.

The present invention overcomes these limitations and provides a multiprocessor data processing system having global data replication where the information transfer over the system bus, including global write operations in all the local memories, is controlled by integrated coprocessors available on the market, with the aid of very simple additional circuits for handling a particular address format.

Briefly stated, the address of a datum comprises a field which defines the datum as global or not and as contained in a memory space which is internal to the processor or not.

When an external memory space is defined, the address field further defines the address as pertaining to a specific one of the processors.

If a processor Z generates an address for a global data write operation, the address defines the internal space of the processor and the nature of the data as global. A very simple decoding network detects the operations to be performed as a global data write and converts the original address into another address which references the memory space of another destination processor.

An interface unit is activated for the transfer of the write command, through the system bus, to the destination processor.

The interface units of the "agent" processor Z and the destination processor or "replier" perform the whole system bus arbitration protocol and a signal exchange which assures the correct transfer of the write command to the destination processor.

Then, the destination processor performs the write operation in its own memory resources.

All other system processors, including the "agent" processor Z have an interface block which detects the signals present on the system bus as pertaining to a global write operation.

They too, in response to such detection, perform the same write operation in their related local memory resources.

They further generate an operation performed signal which is transferred, through a lead set which may be defined as auxiliary bus, to the interface unit of the destination processor.

This interface unit provides to complete the execution of the system bus protocol and guarantees that the global write operation has been properly performed in all the system processors.

According to a further aspect of the invention, in case a global data "read-modify-write" operation has to be performed (in which case a read-operation precedes in an unseverable or atomic way a write operation), the read operation is performed in the local memory of another processor, a destination processor, rather than in the local memory of the agent processor.

In this way deadlock problems and inconsistency of the local memories contents are avoided, still using a very simple control logic in that the RMW (read-modify-write) operation is performed by exploiting the lock feature of the system bus.

The features and the advantages of the invention will appear more clearly from a following description of a preferred form of invention embodiment and from the appended drawings where.

DETAILED DESCRIPTION

Figure 1:
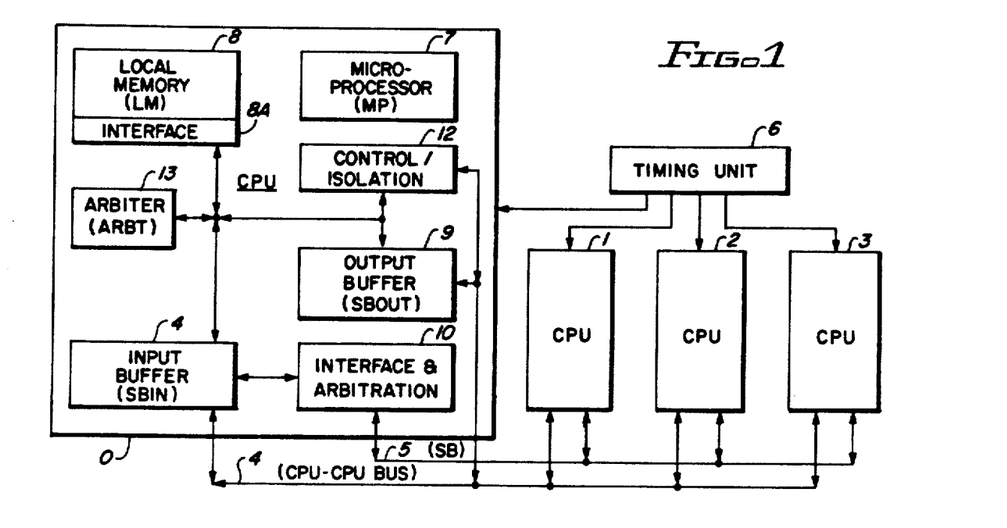
FIG. 1 is a block diagram of a preferred embodiment of a multiprocessor system having global data replication.

FIG. 1 is a block diagram of a preferred embodiment of multiprocessor system having global data replication.

The system comprises four control processing units or CPU,0,1,2,3 identical each to the others in their architectural details.

These details are shown with reference to CPU 0 only.

The several CPUs communicate among themselves through a system bus (SB) 5 and an auxiliary bus 4 or CPU-CPU BUS.

A timing unit 6 provides the timing signals required for system operation.

CPU 0 (and any other CPU,1,2,3) comprises a processing unit 7 or microprocessor MP, a local memory 8 (LM) and system bus interface and arbitration unit 10 (INT & ARB).

These units communicate among themselves through a local bus 11.

More precisely MP7 is connected to the local bus 11 through a control and isolation block 12, and the interface unit 10 is connected to the local bus 11 through an output buffering block 9 (SBOUT) and through an input buffering block 40 or SBIN.

Local memory 8 is connected to the local bus through an interface block 8A.

Access to the local bus 11 from the several units is controlled by an arbitration block 13 or ARBT.

Interface unit 10 enables connection of the system bus 5 to local bus 11, through block 40, when requests for access to local bus are received from the system bus, and through block 9 when requests for access to system bus are received from local bus.

Interface unit 10, together with the corresponding interface units of the other CPUs, provides for arbitrating access to the system bus.

The architecture which has been so sketched, except for the presence of the auxiliary bus 4 and the implementing details of the several blocks, is the specific object of the Italian patent application (filed Nov. 18 1988 with N. 22651A/88,) having as its title: Multiprocessor system having distributed shared resources and deadlock prevention.

The purpose of such architecture is to avoid deadlocks in the system and to achieve a more efficient use of the local bus in the several CPUs.

To this patent application reference is made for a detailed description of the system features which extend beyond the scope of the present invention.

In the following the features specific and essential to the present invention will be described.

In particular blocks 12,9,40 of each CPU will be described. These blocks of one CPU are interconnected with the corresponding blocks of the other CPUs through the auxiliary bus 4.

The microprocessor MP7 is preferably the integrated circuit microprocessor 68030 of the US firm MOTOROLA and the interface unit 10 essentially comprises the integrated circuit interface coprocessor MPC of the US firm INTEL.

The system bus is preferably of a type known as MULTIBUS II.

The publications: MC68030-Enhanced 32-Bit Microprocessor User Manual, Motorola Inc. 1987; - MPC User Manual, Intel Corp. 1986; - MPC 82389 Message passing coprocessor: A Multibus II Interface Controller, Intel Corp. 1988; - High performance Synchronous 32-bit Bus Standard, IEEE 29/9/1987, provide a detailed information on the operation and utilization of the above mentioned components and system bus.

Considering again FIG. 1 it may be seen that the auxiliary bus 4 is connected to blocks 9,12,40.

Auxiliary bus 4 basically comprises eight leads for the exchange of the following signals:

CPU0A, CPU1A, CPU2A, CPU3A. Each of these signals is generated by CPU0,1,2,3 respectively and received by all other CPUs. Each of these signals indicates that the related CPU is present in the system and active. As known a multiprocessor system may generally have a configuration with a variable number of CPUs, depending on user needs.

GCOM0, GCOM1, GCOM2, GCOM3. Each of these signals is generated by CPU0,1,2,3 respectively (in particular by block 40 of each CPU) and is received by all others CPUs (in particular by block 40).

Each of these signals, when asserted, indicates that a global data write operation has been completed in the local memory of the related CPU.

Signals CPUiA support the message exchange among processors and the resource utilization of a CPU from another CPU by providing indication on the status of the system.

They further support, together with signals GCOMi, the execution of global data write operations in the local memory of all the system processors.

These multiple writes are named in the following as global writes.

Figure 2:
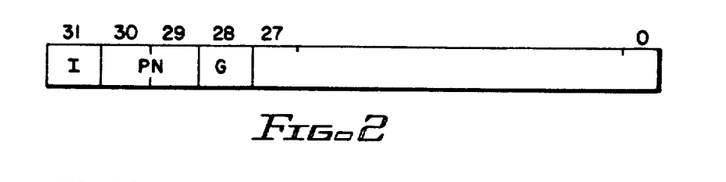
FIG. 2 shows the address format used by the system processors of FIG. 1.

FIG. 2 shows the format of the addresses generated by processor MP1 and conveyed on local bus and system bus.

Each address comprises 32 bits. The least significant bits 0-27 define a memory address in a space of 256 MBytes.

Bits 31-28, respectively named as I (for internal space, bit 31, PN (for Processor Number, bits 29,30) and G (for Global, bit 28), define the nature of the space addressed by bits 0-27 according to the following logical table, where 0 and 1 indicates the logical level true-false respectively and X indicates an indifference condition.

The following table shows several possible cases:

| BIT | | | | |
|---|---|---|---|---|
| 31 | 30 | 29 | 28 | SELECTED SPACE |
| 0 | 0 | 0 | 0 | CPU0 MEMORY SPACE FOR LOCAL DATA |
| 0 | 0 | 0 | 1 | CPU0 MEMORY SPACE FOR GLOBAL DATA |
| 0 | 0 | 1 | 0 | CPU1 MEMORY SPACE FOR LOCAL DATA |
| 0 | 0 | 1 | 1 | CPU1 MEMORY SPACE FOR GLOBAL DATA |
| 0 | 1 | 0 | 0 | CPU2 MEMORY SPACE FOR LOCAL DATA |
| 0 | 1 | 0 | 1 | CPU2 MEMORY SPACE FOR GLOBAL DATA |
| 0 | 1 | 1 | 0 | CPU3 MEMORY SPACE FOR LOCAL DATA |
| 0 | 1 | 1 | 1 | CPU3 MEMORY SPACE FOR GLOBAL DATA |
| 1 | 0 | 0 | 0 | INTERNAL CPU MEMORY SPACE FOR LOCAL DATA |
| 1 | 0 | 0 | 1 | INTERNAL CPU MEMORY SPACE FOR GLOBAL DATA |
| 1 | 0 | 1 | X | I/O PERIPHERAL UNIT SPACE |
| 1 | 1 | 0 | X | I/O PERIPHERAL UNIT SPACE |
| 1 | 1 | 1 | X | I/O PERIPHERAL UNIT SPACE |

It may be seen that the internal CPU memory space of each processor is defined by two addresses, depending on whether it is selected from the inside of the related CPU (code 100X) or from the outside, through the system bus (code 0XXX).

The preceding description is important for the understanding of the global write mechanism.

In the following, a letter Z or K added to the reference numbers used in FIG. 1 identifies the relationships of the elements referenced by the numbers, to a CPUZ or CPUK respectively.

When processor 7Z of a generic CPUZ among CPU0,1,2,3 intends to modify, say write a global data in its own local memory, it generates an address where bits 31 and 28 are asserted and bits 29,30 are deasserted (internal memory space for global data) together with a write command (R/W deasserted).

Block 12Z detects the command as related to a global data and once obtained access to the local bus, rather than directing the write command (and related data, address) to the local memory interface block 8AZ, it passes the command to block 9Z which in turn activates the interface unit 10Z. This occurs only if at least one CPUK other than CPUZ is present and active in the system.

Otherwise everything happens as if the write would be for the internal local memory space.

At the same time block 9Z modifies the write address so that the bits 31,30,29 reference a generic CPUK other than Z and selected among the active CPUs.

This operation, which could be performed by block 12Z, is performed by block 9Z so that the time required for its execution may be overlapped to the time required for arbitration of the access to the system bus.

The interface unit 10Z of CPUZ arbitrates access to the system bus 5 with the corresponding units of the other CPUs. Once access is obtained, it puts on the system bus the modified address and the data to be written, in compliance with the bus protocol.

The interface unit 10 of the several CPUs, other than CPUZ, are each preset, at system initialization, to detect an address field on the system bus, where bits 31,30,29 identify the related CPU.

Therefore the interface unit 10K recognizes the address present on the system bus as related to a CPUK memory space and activates, always in CPUK, the input block 40K. In addition it provides to perform the required dialogue on the system bus as a "replier" to the agent unit 10Z, in compliance with the system bus protocol.

Block 40K, once having obtained access to local bus 11K by arbitrator 13K may control the write operation in the local memory 8K.

In each CPU block 40 is provided with a bus watching logic for monitoring the status of the system bus. Every time that a global write command is present on the system bus (that is a write command together with an address related to an external CPU space and where bit 28 is further asserted) this status is detected and block 40 (in each CPU) latches the address, data, command and requests access to the local bus of the related CPU.

When access is obtained, the write command is directed to the corresponding local memory and latched therein for the immediate or deferred execution of the requested operation.

Once the write command has been forwarded to the local memory, each of the blocks 40 asserts signal GCOM 0,1,2,3 to signal that the write operation has been commanded.

As already said, these signals are exchanged, through the auxiliary bus, among all blocks 40 of the several CPUs, which, on receipt of the joint assertion of the several signals GCOM0,1,2,3 (for the active CPUs only) each generate, towards the related interface unit 10, a signal COM.

This signal is meaningful only for the "replier" which is active.

This signal is used by unit 10K, which is active as a "replier", to complete the dialogue on the system bus and to implicitly indicate that the global write operation has been commanded in all the local memories.

In case of "Test & Set" operation (or Read-Modify-Write) related to global data, that is in case of read operation followed in unseverable way by a write operation, the above process is performed for execution of the write phase.

In addition, even in the read phase, block 12Z selects and posts the read command in block 9Z, instead of selecting the local memory 8Z as a destination unit and performing therein the read operation.

Block 9Z, in turn, modifies the address so as to reference an external space and another active CPUK where to perform the read operation.

A write operation performed in all local memories, follows in unseverable way, the read operation.

Unseverability of the read, write operations is provided by a command RMC generated by processor MPZ, transferred by block 12Z to local bus and to block 9Z as a signal LBRMC.

From block 9Z signal LBRMC is transferred to block 10Z as a signal LOCK asserted.

Assertion of LOCK signal activates the lock functionalities of the system bus for the whole duration of the read-modify-write sequence.

The LOCK signal compels interface unit 10Z to retain control over the system bus, once control has been obtained, until LOCK is deasserted.

The interface unit 10Z asserts a signal SC1, with the meaning of LOCK command on the system bus.

This signal is received by units 10K and 40K of CPUK, which acts as a "replier".

The interface unit 10K activates block 40K to request access to local bus 11K and once access is obtained, the read command is transferred to interface block 8AK of local memory 8K, together with a signal LK (obtained from SC1).

Signal LK is detected by block 8AK, which asserts a signal SBLMLK to inform the other units of CPUK that a an unseverable operation for "read-modify-write" has been started and therefore access to local memory is permitted to block 40 only.

Once the sequence of unseverable operations has been compelled by block 40 and signal LK is deasserted, signal SBLMLK is deasserted too.

With this method of execution of test & set operations on global data, any deadlock or consistency problem is avoided.

In fact, any CPU willing to perform a test & set operation on the same address, must first obtain access to the system bus and if the system bus is already busy it must wait for completion of the full read-write operation.

Therefore it cannot interfere with the already running operation and cause a deadlock nor it can interfere with the operation in course of execution by reading or modifying the data which are being read by another CPU.

Figure 3:
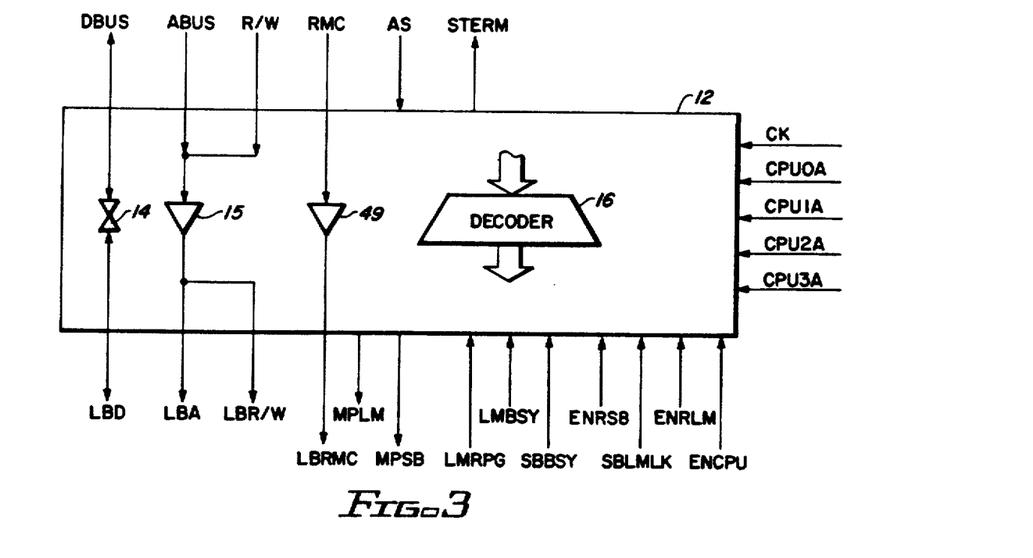
FIG. 3 shows in schematic form an interface block disposed between a processor and a local bus in the system of FIG. 1.

FIG. 3 shows in schematic the block 12 which basically comprises a set of bidirectional gates 14 for connecting the data channel DBUS of processor MP to data channel LBD of the local bus, a set of tristate gates 15 for connecting the address channel ABUS of microprocessor MP to the address channel LBA of the local bus and a combinatorial network or decoder 16.

Gates 15 further control signal R/W in output from processor MP.

A driver 49 transfers the signal RMC, received from processor MP on the local bus as an output signal LBRMC.

Network 16, depending on signals received from MP and from the local bus, generates signals in output from block 12 and control signals for gates 14,15.

The leads/signals interfacing with MP1 are shown on the upper side of block 12.

The leads/signal interfacing with local bus 11 are shown on the lower side of block 12.

The following list gives the meaning of the several signals:

DBUS: data input/output from MP
ABUS: addresses in output from MP
R/W: read control signal (R/W asserted) or write control signal (R/W deasserted)
RMC: lock signal for unseverable read/write operations.
AS: strobe and validation signal (when asserted) for addresses and commands.
CK: periodic timing signal from timing unit 6.
STERM: signal input to MP which indicates completion of a write operation or read data available within the next following clock signal CK in case of read operation.
LMBSY: output from 8A indicates that block 8A is busy and cannot accept commands.
LMRPG: output from 8A indicates that a read operation is in course of execution.
SBBSY: output from block 9 indicates that block 9 is busy and cannot accept commands.
LBD: data input/output on local bus.
LBA: output addresses on local bus.
LBR/W: read/write command on local bus
LBRMC: lock signal on local bus, for unseverable read/write operations and more generally for a sequence of unseverable operations.
MPLM: local memory selection signal from block 12 (MP).
MPSB: system bus and block 9 selection signal from block 12 (MP).
SBLMLK: lock signal from block 8A to indicate that the local memory is locked for unseverable read and write operation controlled from system bus.
ENCPU: signal from arbitrator 13 which enables block 12 to have access to the local bus.
ENRLM: signal from arbitrator 13 indicating that the local memory is enabled to reconnect to the local bus for outputting a read data.
ENRSB: signal from arbiter 13 which enables the system bus, through block 9, to reconnect to the local bus for putting a read datum thereon.

Block 12 further receives (right side of FIG. 3) the signals CPU0A, CPU1A, CPU2A, CPU3A, which define the active/inactive state of the several CPUs.

Gates 14 are enabled in output, towards local bus, by signal MPLM or MPSB in logical AND with signal R/W deasserted. They are enabled in input, towards MP, by R/W asserted.

Gates 15 are enabled in output towards local bus by signal MPLM or MPSB.

Better than any circuit description, the structure of network 16 is described by the following logical equations, where letter N preceding the name of the signals has the meaning, here and in the following, of the negation operator:

$$MPLM = ENCPU.AS.A31.NA30.NA29.NLM\text{-}\\BSY.NR/W.NSBLMLK.N(A28.CPUMA) + ENC\text{-}\\PU.AS.A31.NA30\text{-}\\.NA29.NLMRPG.R/W.NSBLMLK.N(R\text{-}\\\overline{MCA}.\overline{A28}.CPUMA)$$

where: asserted and A30,A29 deasserted define the internal memory space of CPU, A28 asserted defines the global space and CPUMA is a signal, obtained from the several signals CPU0A,CPU1A,CPU2A,CPU3A, which, when asserted, indicates that at least two CPUs are active. For instance:

$$CPUMA = CPU0A.(CPU1A + CPU2A + CPU3A) + \\CPU1A.(CPU2A + CPU3A) + CPU2A.CPU3A$$

The preceding equation tells that block 12 selects the local memory if this is permitted by arbitrator 13 (ENCPU asserted), if the local memory is available (LMBSY or LMPPG deasserted together with SBLMLK) and if the operation is not a global data write or a test and set operation in effective multiprocessor environment.

$$MPSB = ENCPU.AS.N.A31.NSBBSY + ENCPU.AS\text{-}\\.A31.(A30 + A29) + \overline{ENCPU}.AS.NR/W.A28.A31\text{-}\\.NA30.NA29.CPUMA.NSBBSY + ENCPU.AS.R/\text{-}\\\overline{W}.A28.A31.NA30.NA29.RMC.CPUMA.NSBBSY$$

The first two terms of this equation indicate that block 12 selects block 9 if bit 31 deasserted references an external space, if block 9 is available and if arbitrator 13 has granted access to local bus, or if a peripheral unit space is referenced (with bock 9 available and access granted).

Block 9 is further selected in case of global data write (A28,A31 asserted and R/W,A30,A29 deasserted) and in case of a read phase of read-modify write operation on global data. In these two cases a further condition is the existence of a multiprocessor environment.

$$STERM = MPLM.NR/W + MPSB.NR/W\text{-}\\+ R/W.AS.A31.(A30 + A29).ENRSB + R/W.AS\text{-}\\.A31.NA30.NA29.ENRLM.N(A28.RMC.\text{-}\\CPUMA) + + R/W.AS.NA31.ENRSB + R/W.AS\text{-}\\.A31.A28.NA30.NA29.\overline{RMC}.CPUMA.ENRSB$$

In this equation MPLM,MPSB may be replaced, for reason of operative speed, by the several generator terms already considered.

The preceding equation substantially indicates that signal STERM for executed operation is asserted with the posting of commands MPLM,MPSB in case of write operation and with the reception of the reconnect signals ENRLM, ENRSB in case of read.

The identification of ENRLM,ENRSB as pertaining to block 12 is made on the basis of R/W asserted and A31,A30,A29,A28,RMC,CPUMA.

Local memory interface block 8A does not deserve any detailed description for which reference is made to the above mentioned Italian patent application N. 22651A/88.

It is only mentioned that processor MP7 receives access right to the local bus, "by default", that is when no other access requests, generated by other entities having higher priority, are present.

To prevent MP7 from having access to local bus for sending commands to the local memory when it has to perform unseverable read write operations, it is required that block 8A send to block 12 the signal SBLMLK, in addition to the signals LMBSY,LMRPG.

Signal SBLMLK is given by the following equation:

$$SBLMLK = ENSB.LK + SBLMLK.LK$$

where ENSB is a signal from arbitrator 13 which grants local bus access to block 40 and at the same time selects the local memory.

LK, from block 40, controls the locking of the local memory for unseverable read, write operations.

As already said SBLMLK is self sustaining as long as LK is asserted.

In a similar way block 8A generates a signal:

$$MPLMLK = MPLM.LBRMC + MPLMLK.LBRMC$$

This signal, asserted owing to local memory access command (MPLM asserted) from MP7 jointly with RMC and deasserted with the deassertion of LBRMC, hence RMC, is used by arbitration unit 13 to inhibit access to local memory by any entity other than MP7, for instance by block 40.

Figure 4:
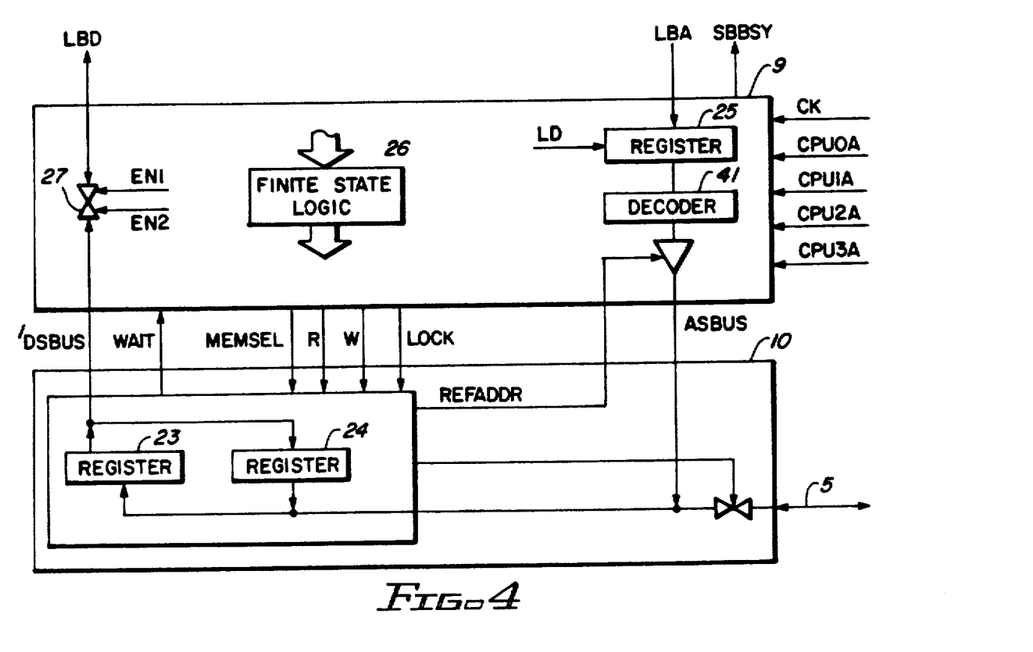
FIG. 4 shows in schematic form an interface block providing access to a system bus from a local bus in the system of FIG. 1.

FIG. 4 shows in schematics the interface and arbitration unit 10, block 9 and the interconnection of the two units among them, and the local bus on one side, the system bus on the other side, and the auxiliary bus 4.

Block 9 exchanges data with local bus 11, receives addresses LBA and commands LBR/W,LBRMC,MPSB,ENRSB from local bus and outputs signals SBREQ (to arbitrator 13) and SBBSY (to arbitrator 13 and to block 12).

Block 9 further receives the timing signal CK from unit 6 (FIG. 1) and signals CPU0A, CPU1A, CPU2A, CPU3A from the auxiliary bus 4.

Block 9 exchanges, with interface unit 10, data (DSBUS).

It further outputs addresses (ASBUS), a signal MEMSEL (which characterizes the operation to be performed), two distinct read (R) and write (W) commands, and a signal of locked resources (LOCK) for performing a sequence of unseverable read, write operations.

Block 9 receives (from interface unit 10) a signal WAIT (indicating that the requested operation is in progress and that in case of read operation is deasserted just before the availability of the data) and a signal REFADDR which enables the transfer of an address on the system bus.

These are the only signals required in case the unit 10 consists in the coprocessor MPC of the INTEL firm.

Unit 10 comprises, in addition to coprocessor MPC 21, a set of control gates 22 which connect the coprocessor to the system bus.

These gates are controlled by coprocessor 21.

Coprocessor 21 comprises two registers 23,24 for latching the data exchanged with block 9.

Once coprocessor 21 is activated by assertion of MEMSEL signal, it manages in an autonomous way the arbitration of the system bus and its protocol.

Block 9 comprises a set of transceivers 27, which isolate the local data bus LBD from data channel DSBUS, a register 25 for latching addresses, a finite state logic 26 for the generation of control signals, a combinatorial network (decoder) 41, connected to the output of register 25, for modifying the addresses in output from register 25 and a set of isolation tristate gates 42, having their inputs connected to the output of decoder 41 and their outputs connected to the system port of coprocessor 21.

The following equations describe the generation of the several control signals:

$$MEMSEL = MPSB$$

$$W = \overline{NLBR/W}.MPSB.CK + W.SBBSY$$

$$R = LBR/W.MPSB.CK + R.SBBSY$$

$$SBBSY = MPSB.CK + SBBSY.\overline{N}REFADDR + SBBSY.WAIT$$

$$SBRPB = R.REFADDR + SBRPG.\overline{N}ENRSB$$

$$SBRQ = SBRQP.\overline{N}WAIT$$

$$LOCK = LBRMC.MPSB + LOCK.LBRMC + LOCK.\overline{N}(REFADDR.W)$$

These equations are imposed by timing requirements of coprocessor MPC.

MEMSEL must be asserted before assertion of R or W. R or W signals must remain asserted at least until WAIT has been deasserted.

WAIT is asserted with a certain delay as to when MEMSEL is received.

Therefore SBBSY needs two terms for self sustenance.

SBRPG is an auxiliary signal for generation of SBRQ.

As to LOCK, it is asserted as soon as MPSB and LBRMC are asserted. It is self sustaining for the whole sequence of unseverable operations say as long as LBRMC is asserted and, in case of a write, at least until the write is effectively posted on the system bus (REFADDR asserted).

Gates 27 are enabled towards MP7 by signal EN1 = MPSB.

Register 25 is loaded by a command LD = MPSB.CK and gates 42 are enabled by the assertion of REFADDR, with the timing imposed by the system bus protocol.

For the present invention purpose decoder 41 is of relevance. In case of global data write or test and set operation on global data, decoder 41 must modify an address which references an internal space in an address referencing an external space, in particular a space related to a processor K other than processor Z to which decoder 41 pertains.

Decoder 41 modifies bits A31,A30,A29 according to the following equations, where the suffix M indicates the modified bits:

$$A31M = A31.A29 + A31.A30$$

$$A29M = A29 + A28.A31.\overline{N}A29.\overline{N}A30.CPU1A.\overline{N}\#1 + A28.A31.\overline{N}A29.\overline{N}A30.CPU3A.\overline{N}\cdot3$$

$$A30M = A30 + A28.A31.\overline{N}A29.\overline{N}A30.\cdot CPU2A.NCP1A + A28.A31.\overline{N}A29.\overline{N}A30.\cdot CPU3A.\overline{N}\#3$$

0,#1,#2,#3 are signals asserted only in the processor which has a corresponding order number: the order number may be given in known manner with an initialization procedure or simply by position of the several CPUs each in a system housing.

The preceding equations indicates that bits A29,A30 and A31 remain unchanged if the address is not related to a global data.

If the address relates to a global data, the original bits A29,A30 are zeroes, but it can be easily verified that they are modified, depending on the state of the several CPUs and the number of the agent CPU so as to reference a local memory space pertaining to a CPUK which is active and other than the agent CPUZ.

Figure 5:
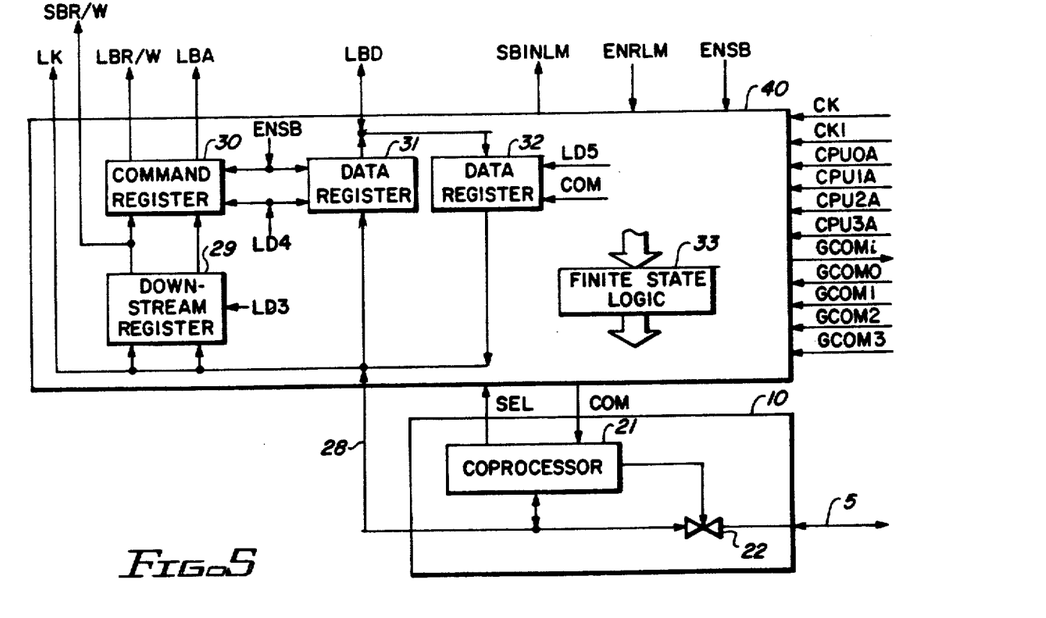
FIG. 5 shows in schematic form an interface block providing access to a local bus from a system bus in the system of FIG. 1.

FIG. 5 shows in schematic the interface and arbitration unit 10, the block 40 (SBIN) and the interconnections among the two units, the local bus on one side and the system bus and auxiliary bus on the other.

As already indicated, the interface unit 10 comprises coprocessor 21 and the set of transceivers 22.

The system bus or more precisely leads of the system bus which transfer addresses, data and commands are connected, through such transceivers, both to block 10 and to block 40, by means of a channel 28 which constitutes a bypass of interface unit 10.

Block 40 essentially comprises a buffer register 29 for latching addresses and commands received through the bypass 28, an address and command register 30 downstream register 29, a data register 31, for data received from the bypass and in input to the local bus, a data register 32 for data in output from the local bus and input to the bypass 28 and by a finite state logic 33, for generating control signals based on the signals received from local bus, from unit 10, from the bypass 28 and from the auxiliary bus 4.

Register 30 has outputs connected to the local bus.

Block 40 receives, from coprocessor 21, a signal SEL which activates the execution of a read command present on the system bus.

Coprocessor 21 receives a signal COM from block 40. COM indicates that block 40 is ready to complete the requested operation.

The following information is exchanged between block 40 and the local bus: data LBD (in output from register 31 or input to register 32), addresses LBA in output from register 30 towards local bus, signals LBR/W SBINLM,LK in output towards local bus, and ENSB,ENRLM in input from local bus.

Block 40 receives further a periodical timing signal CK1 (in addition to CK) from timing unit 6. CK1 is a signal for timing the operations on the system bus.

Signals CPU0A,CPU1A,CPU2A,CPU3A are received by block 40 from the auxiliary bus.

In addition, depending on its pertinence to a generic CPUi, block 40 outputs a signal GCOMi on auxiliary bus and receives from the auxiliary bus the signals GCOM0,GCOM1,GCOM2,GCOM3.

These signals will be considered in the following. For a better understanding of the operation and structure of block 40, the case in which coprocessor 21 act as "replier" is considered first.

Coprocessor 21, as known, continuously monitors the signals present on the system bus and is capable of distinguishing among the several phases of arbitration, command and data transfer in course on the system bus.

It is further capable of distinguishing address fields which reference it as an interface for a destination space. When so referenced, coprocessor 21 asserts signal SEL towards block 40.

SEL remains asserted until the "handshaking" procedure on the system bus is completed, that is until certain signals, referenced as BSC2,BSC3,BSC4 becomes asserted.

In block 40, register 29 may be defined as a "freezing" register for a transient status occurring on the system bus, that is a command phase in which addresses and commands are present on the system bus. This phase is characterized by the assertion of a control signal BSC0.

The loading control signal used by register 29 is therefore LD3=BSC0.CK1 and the information loaded in register 29 remains there until BSC0 is newly asserted.

Loading of register 29 is completely independent of SEL signal and occurs owing to the protocol in course on the system bus.

On the contrary, registers 30 and 31 are loaded by a control signal LD4 given by equation:

$$LD4 = SEL.\overline{NBSY}.\overline{NSEL1}$$

In other words, if coprocessor 21 detects the address present on system bus as an owned destination space and asserts signal SEL (this occurs when the address is no longer present on the system bus, and in case of a write the address is replaced by a datum to be written), the address and the commands latched in register 29 are loaded in register 30 and the data which may be present on the system bus is loaded in register 31.

This operation is performed only if the two internal signals BSY and SEL1 are deasserted.

BSY indicates that registers 30 and 31 are busy and is defined by the following equation:

$$BSY = LD4 + BSY.ENSB.CK$$

It is asserted by LD4 and is self sustaining until unit 40 receives signal ENSB, synchronized by signal CK.

SEL1 is an auxiliary signal defined by the following equation:

$$SEL1 = SBLM + SEL1.\overline{N(NSEL.CK1)}$$

It is asserted with the command SBLM which connects block 40 to the local bus and is self sustaining until the first system bus clock CK1 during which signal SEL is deasserted.

In the equation which defines LD4, the term $\overline{NSEL1}$ assures that upon loading of registers 30,31 they do not change their status until signal SEL is certainly deasserted, even if BSY is deasserted in advance.

Signal SBINLM, by which access to local bus is requested, is given by SBINLM=BSY. SBR/W consists in system bus signal BSC6. BSC6 is a control signal of the system bus, which is latched in register 29. When asserted, BSC6 indicates that the requested operation is a write. SBR/W is used internally to block 40 to "remember" that the requested operation is a read, and therefore data received from local memory are to be accepted during the reconnect phase.

It is further sent to arbitrator 13, which prevents access to local memory by block 40 if a read operation is pending.

Signal LK is given by LK=BSC1 BSC1 is a control signal present on system bus which locks the requested resources for the whole time required to perform a sequence of unseverable operations. Differently from the other signals coming from the system bus, it is not latched in registers 29,30 but is directly transferred to the local bus.

Registers 30,31 have their outputs enabled by signal ENSB received from arbitrator 13.

Signal COM is defined by the following equation.

$$COM = SBINLM.NSBR/W.NA28 + ENRLM.SB\overline{R}/W + CO\overline{M}.SEL1$$

It is asserted with the access request to local bus in case of non global data write and with the local memory reconnect command detected as of pertinence in case of read.

COM is self sustaining until SEL1 is deasserted.

In case of non global data write, COM signals to coprocessor MPC that the interface protocol may be concluded and in case of a read it signals that the read data is available.

Coprocessor 21 provides for controlling gates 22, normally enabled to receive information from system bus, for the transfer of a read data, latched in register 32 by a command $LD5 = ENRLM.SBR/W.CK$, to the system bus, through the bypass 28. Coprocessor 21 provides further to complete the dialogue on the system bus. The outputs of register 32 are enabled by signal COM.

In case of global data write, block 40K of CPUK which is designated as "replier" and related interface unit 10K, perform as described, but generation of signal COM occurs according to a different equation which will be later considered. Operation of block 40 in case of global data write is now explained.

It has been previously seen that register 29 is loaded with addresses and commands on the occurrence of signal BSC0 on the system bus.

The loading is performed independently of any subsequent assertion of signal SEL.

Therefore, if A28=1 and A31=0, the finite state logic 33 generates control signal LD4 according to the equation:

$$LD4 = A28.NA31.NBSY.NSEL1.NBSC.CK1$$

In other words, when the data to be written is present on the system bus (BSC0 is deasserted), if A28 is asserted, A32 deasserted and if unit 40 is not busy, the registers 30,31 are loaded. LD4 generates BSY and SBINLM in the previously explained way.

Therefore, in case of global write, all local units 40 of the active CPUs request access to local bus in order to perform a write in their related local memory. In every unit 40i, the reception of signal ENSBi causes the generation of a signal:

$$GCOMi = A28.ENSBi + GCOMi.NGLOBACK$$

where:

$$GLOBACK = (GCOM0 + N\#0).(GCOM1 + N\#1).(GCOM2 + N\#2).(GCO\overline{M3} + N\#3)$$

In other word signal GCOMi is self sustaining until every block 40 receives confirmation from all active CPUs that the write operation has been started.

GLOBACK is used to generate signal COM in case of global write according to equation:

$$COM = A28.NSBR/W.GLOBACK + COM.SEL1$$

In this case COM is generated with the execution of the global write in all active CPUs and is self sustaining in the CPU which acts as "replier" until SEL1 is deasserted.

In the other CPUs, SEL1, hence COM, is self sustaining until a signal CK1 next following deassertion of ENSB is received, because SEL is deasserted (equation 1).

Therefore it must be noted that every block 40, in case of global data write, asserts a signal COM towards the interface unit.

However signal COM, so generated, is meaningful for the only unit active as "replier" and is neglected by all other interface units.

In each of the CPUs, access to local bus by the several contending units such as block 12, block 9, block 40 and block 8A, is controlled by arbitration unit 13 which may be of any conventional type and does not require any detailed description.

An exhaustive description of a particular kind of arbitration unit, which grants access to the requesting block, not only in accordance with a predetermined priority level, but also depending on availability of the destination unit to perform the requested operation, is provided by the already mentioned Italian patent application, to which reference is made for implementing details.

The implementation of the decoders and finite state logic consisting in the elements referenced by numerals 16,26,41,33 which have been described in terms of logical equations can be easily constructed on the basis of the logical equations, with components available on the market, such as AND,OR,INVERTERS, or preferably by means of programmable array logic (PAL) or gate array logic.

The architecture of the several CPUs, shown in FIG. 1, comprises only two units which may act as "masters" having access to local memory. They are the microprocessor MP and the interface block 40.

However the several CPUs may comprise a greater number of master units, such as for instance a direct memory access unit or DMA.

Further in the block diagram of FIG. 1, there is shown an architecture in which the local memory of each CPU, is of a single input/output port type, and access to local memory by block 40 is performed through local bus.

However it is possible to use an architecture in which the local memory is of the "two port" type, one port being connected to local bus, the other port being directly connected to input block 40.

In this case block 40 may have direct access to local memory (provided it is not busy) without need of access to local bus.

At system level too it is clear that, even if FIG. 1 shows four CPUs connected to the system bus 5, other units such as controllers of peripheral units, mass memories, printers and like, or communication lines may be connected to the system bus and referenced by several CPUs through their output interface block, as if they were a generic space which in the address qualification table has been defined as "peripheral I/O space".

To this purpose it is worthy of mention that these I/O units may perform access operation to global data in any one of the system CPUs and may also use all the described functionalities of lock, write, global data modification jointly in all local memories of all CPUs in the system.

What is claimed is:

1. A multiprocessor system utilizing replicated global data and comprising a plurality of central processing units (CPU) connected each to the other and intercommunicating through a system bus, to which each CPU has access as a requesting agent, each CPU comprising a related processor (MP) and a related local memory (8) connected by and intercommunicating through a local bus (11), a related output interface unit (9, 10) connecting the related CPU to said system bus and providing access to said system bus from said related CPU as a requesting agent; said local memory in each CPU storing a copy of a plurality of global data; each CPU further comprising:

an input interface unit (40, 10) for accessing said local memory from said system bus;

first logic circuits (16) for detecting an active system configuration having a plurality of active CPUs and a write operation command related to global data, said write operation command being generated, in the CPU comprising said first logic circuits, by the related processor and referencing the related local memory;

second logic circuits (41) for modifying the address of said write operation command to reference a local memory space of one of said active CPUs, identified by said modified address as a destination CPU of said write operation command, said first logic circuits activating said output interface unit (9, 10) to obtain access to said system bus by the related requesting agent CPU and to transfer said write operation command and said modified address onto said system bus;

third logic circuits (10, 40, 21) operative in said destination CPU for recognizing said write operation command and for performing said write operation into the local memory of said destination CPU;

fourth logic circuits (40, 33) operative in all active CPUs other than said destination CPU, said active CPUs including said requesting agent CPU, for:
  a) identifying said write operation command, referencing said destination CPU, as a write command related to a global data;
  b) performing said write operation into the local memory of the CPU comprising said fourth logic circuits; and
  c) signalling to said destination CPU the posting of said write operation; and fifth logic circuits (39, 10) operative in said destination CPU for detecting that said write operation has been posted in all active CPUs and for providing detection consequent response signals, on said system bus, to said requesting agent CPU.

2. A multiprocessor system according to claim 1 in which said first logic circuits are operative for detecting an unseverable read-modify-write command related to a global data, generated in the related CPU by the related processor and referencing the related local memory; said second logic circuits being operative for modifying the address of said read-modify-write command to reference a local memory space of one of said active CPUs identified by said modified address as destination CPU, said first logic circuits activating said output interface unit (9, 10) to obtain access to said system bus for the related requesting agent CPU and to transfer said read-modify-write command with said modified address on said system bus; and said third logic circuits being operative in said destination CPU for recognizing said read-modify-write command and for performing said read-modify-write operation in the local memory related to said destination CPU.

* * * * *